United States Patent [19]
Klein

[11] Patent Number: 5,255,109
[45] Date of Patent: Oct. 19, 1993

[54] HEAT DISSIPATING LCD DISPLAY
[75] Inventor: Dean A. Klein, Lake City, Minn.
[73] Assignee: PC Tech Inc., Lake City, Minn.
[21] Appl. No.: 872,364
[22] Filed: Apr. 23, 1992
[51] Int. Cl.$^5$ .............................................. G02F 1/133
[52] U.S. Cl. ....................................... 359/43; 359/44; 359/79
[58] Field of Search ....................... 359/43, 44, 74, 79

[56] References Cited
U.S. PATENT DOCUMENTS

| | | |
|---|---|---|
| 3,410,999 | 11/1968 | Fergason et al. ............ 359/43 |
| 3,936,817 | 2/1976 | Levy et al. .................. 359/43 |
| 4,051,435 | 9/1977 | Fanslow ...................... 359/43 |
| 4,196,974 | 4/1980 | Hareng et al. ............... 359/43 |
| 4,773,735 | 9/1988 | Ukrainsky et al. ........... 359/43 |
| 4,838,664 | 6/1989 | Graham ....................... 359/44 |

FOREIGN PATENT DOCUMENTS

| | | | |
|---|---|---|---|
| 0027128 | 2/1983 | Japan | 359/43 |
| 0034517 | 2/1984 | Japan | 359/44 |
| 0210325 | 8/1990 | Japan | 359/43 |

Primary Examiner—William L. Sikes
Assistant Examiner—Huy K. Mai
Attorney, Agent, or Firm—Hugh D. Jaeger

[57] ABSTRACT

Heat dissipating LCD display where heat dissipating materials, including an aluminum plate and a mica sheet are interspersed between an LCD screen display and a screen mounted LCD power supply to eliminate localized LCD screen heating, and to increase LCD screen display performance by application of dissipated heat to a large area of the LCD screen display.

24 Claims, 1 Drawing Sheet

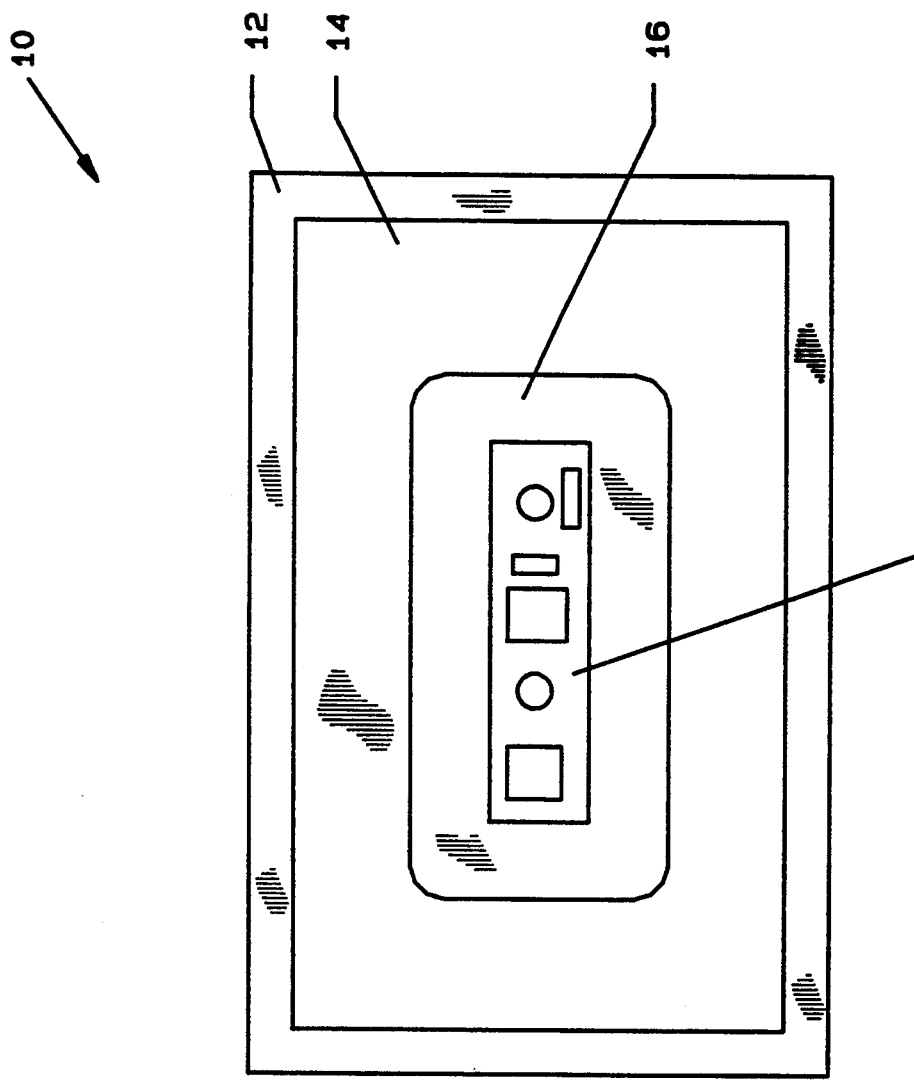

HEAT DISSIPATING LCD DISPLAY

CROSS REFERENCES TO CO-PENDING APPLICATIONS

None.

BACKGROUND OF THE INVENTION

1. Field of the Invention

The present invention pertains to a laptop or notebook computers, and more particularly pertains, to the LCD screen display of the laptop or notebook computer.

2. Description of the Prior Art

Prior art LCD display screens have LCD power supplies affixed to the rearward surface or edge of the LCD display screens for reasons of compactness This arrangement offered benefits while still having undesirable side effects in that the area of the LCD screen where the LCD power supply was attached received transient heat from the LCD power supply causing the LCD display in that area to exhibit contrast and color shift inconsistent wit the remainder of the display. Sometimes cold starts of laptop computers offer poor initial performance due to sluggishness of cold LCD displays on start up The present invention overcomes the deficiencies of the prior art by providing a heat dissipated LCD screen having an aluminum plate and a mica sheet interposed between the LCD power supply and the LCD screen display to evenly disperse heat over and about the entire surface of the LCD screen display.

SUMMARY OF THE INVENTION

The general purpose of the present invention is to provide a heat dissipated LCD display. Plates or sheets of heat conducting materials are placed between a screen mounted LCD power supply and LCD screen display to disperse and dissipate heat from the LCD power supply over and about the entire rearward surface of the LCD display. This dispersion of heat over a large area reduces localized heating of the LCD display screen and improves LCD response time over the entire LCD display.

According to one embodiment of the present invention, there is provided a heat dissipated LCD display having ordered layers first including an LCD screen display followed in order by an aluminum plate, a mica sheet and an LCD power supply. The LCD power supply is centrally located to allow outward uniform heat dissipation through the mica sheet, to the aluminum sheet and then finally the LCD screen display.

One significant aspect and feature of the present invention is a heat dissipating LCD display.

Another significant aspect and feature of the present invention is the elimination and/or reduction of localized heated LCD display areas.

A further significant aspect and feature of the present invention is the application of heat to th entire LCD display to improve LCD response time.

Yet another significant aspect and feature of the present invention is the incorporation of a plate of aluminum or other heat conductor, such as copper, and a sheet of mica or other material between an LCD screen display and the LCD power supply for the purpose of spreading or dissipating heat.

Having thus described the embodiments of the present invention, it is the principal object hereof to provide a heat dissipating LCD screen.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1 illustrates a rear view of a heat dissipated LCD display.

DESCRIPTION OF THE PREFERRED EMBODIMENTS

FIG. 1 illustrates a back view of a heat dissipated LCD display 10, such as used in a laptop or notebook computer. The improved heat dissipated LCD display 10 includes an LCD screen display 12, an aluminum plate 14 affixed over the rearward surface of the LCD screen display 12, a mica sheet 16 affixed over the rearward surface of the aluminum plate 14 and an LCD power supply (or inverter) 18 affixed over the rearward surface of the mica sheet 16. The aluminum plate 14 can also be of a material such as, but not limited to, copper, tin, steel or any material which can conduct away or dissipate heat to the LCD display 12. The mica sheet 16 can also be of a material such as, but not limited to, asbestos, paper, cloth, fiberglass, foam, rubber, polymer, or other such material. The mica sheet 16 dissipates heat from the LCD power supply 18 to the aluminum plate 14 which in turn dissipates heat to the LCD display 12. The benefit of this arrangement is twofold in that localized heating of the LCD screen display 12 is eliminated and that the response time of the LCD screen display 12 is sped up and enhanced in that regions of the LCD screen display 12 heretofore previously unwarmed now receive the benefit of being heated. Heat from the LCD power supply 18 is spread over and about the LCD screen display 12 with the aid of the mica sheet 16 and aluminum sheet 14. The shape of the aluminum plate 14 and mica sheet 16 may be modified to specifically match the characteristics of the display unit.

MODE OF OPERATION

The LCD display exhibits enhanced contrast and color shift by distributing the heat generated by the LCD power supply across the back of the LCD display.

Various modifications can be made to the present invention without departing from the apparent scope hereof.

I claim:

1. Heat dissipating LCD display comprising:
   a. an LCD display;
   b. a heat spreading means on a back of said display; and,
   c. an LCD power supply affixed to said heat spreading means.

2. The heat dissipating LCD display of claim 1 wherein said heat spreading means is aluminum and mica.

3. The heat dissipating LCD display of claim 1 wherein said heat spreading means is copper and mica.

4. The heat dissipating LCD display of claim 1 wherein said heat spreading means is only aluminum.

5. The heat dissipating LCD display of claim 1 wherein said heat spreading means is only copper.

6. Heat dissipating LCD display comprising:
   a. an LCD display;
   b. a heat spreading means on a back of said display;
   c. an insulating means on a back of said heat spreading means; and,
   d. an LCD power supply affixed to said insulating means.

7. The heat dissipating LCD display of claim 6 wherein said heat spreading means is aluminum.

8. The heat dissipating LCD display of claim 6 wherein said heat spreading means is copper.

9. The heat dissipating LCD display of claim 6 wherein said insulating means is mica.

10. The heat dissipating LCD display of claim 6 wherein said insulating means is fiberglass.

11. The heat dissipating LCD display of claim 6 wherein said insulating means is polymer.

12. Heat dissipating LCD display for a laptop, notebook or like computer comprising:
    a. an LCD display;
    b. a heat spreading means on a back of said display; and,
    c. an LCD power supply affixed to said heat spreading means for enhancing contrast and color shift of said display.

13. The heat dissipating LCD display of claim 12 wherein said heat spreading means is aluminum and mica.

14. The heat dissipating LCD display of claim 12 wherein said heat spreading means is copper and mica.

15. The heat dissipating LCD display of claim 12 wherein said heat spreading means is only aluminum.

16. The heat dissipating LCD display of claim 12 wherein said heat spreading means is only copper.

17. The heat dissipating LCD display of claim 12 further comprising an insulating means on a back of said heat spreading means.

18. The heat dissipating LCD display of claim 17 wherein said insulating means is mica.

19. The heat dissipating LCD display of claim 17 wherein said insulating means is fiberglass.

20. The heat dissipating LCD display of claim 17 wherein said insulating means is polymer.

21. A heat dissipating computer LCD display comprising:
    a. an LCD display for displaying computer data;
    b. a heat-generating LCD power supply mounted on a back side of the LCD display; and,
    c. a heat spreader plate mounted between the back side of the LCD display and the LCD power supply, the heat spreader plate being larger than the LCD power supply in area and covering substantially the entire back side of the LCD display, for generally uniformly spreading heat generated by the LCD power supply over the entire LCD display back side for reducing localized heating of the LCD display.

22. The heat dissipating LCD display of claim 21 further comprising:
    a. an insulating layer, larger in area than the LCD power supply, mounted between the LCD power supply and the heat spreader plate for dissipating heat from the LCD power supply to the heat spreader plate, and, in turn, to the back side of the LCD display.

23. The heat dissipating LCD display of claim 21 wherein the LCD power supply is centrally located relative to the heat spreader plate.

24. A heat dissipating LCD display comprising:
    a. an LCD display for displaying data;
    b. a heat spreader plate mounted on the back side of the LCD power display covering substantially the entire back side of the LCD display, the heat spreader plate being constructed of material having a high-rated heat dispersion;
    c. an insulating layer mounted on the heat spreader plate; and,
    d. an LCD power supply mounted on the insulating layer wherein heat generated by the LCD power supply is dissipated to the heat spreader plate through the insulating layer and wherein the heat spreader plate uniformly transmits heat to all parts of the LCD display for reducing localized heating of the LCD display.

* * * * *